Figure 1:
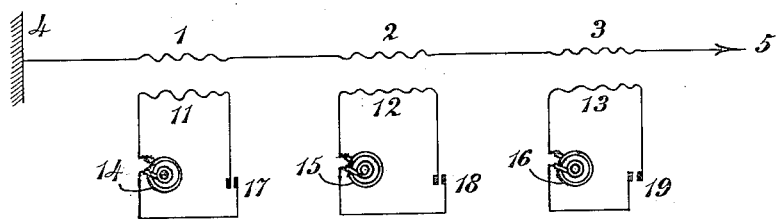

F. LORI.
SYSTEM OF MULTIPLE AND SIMULTANEOUS TELEGRAPHY.
APPLICATION FILED JAN. 13, 1906.

1,048,980.

Patented Dec. 31, 1912.

UNITED STATES PATENT OFFICE.

FERDINANDO LORI, OF PADUA, ITALY.

SYSTEM OF MULTIPLE AND SIMULTANEOUS TELEGRAPHY.

1,048,980.

Specification of Letters Patent. Patented Dec. 31, 1912.

Application filed January 13, 1906. Serial No. 295,994.

*To all whom it may concern:*

Be it known that I, FERDINANDO LORI, professor at the Royal School of Engineers at Padua, subject of the King of Italy, residing at Padua, Italy, have invented new and useful Improvements in or Relating to Systems of Multiple and Simultaneous Telegraphy, of which the following is a specification.

This invention relates to line telegraphy and has for its object to provide an improved system of multiple and simultaneous telegraphy of the following kind: At the transmitter station there are several sources of electro-motive force of different frequency, generated by as many alternaters. Each of the latter acts by means of a contact breaker, for instance a Morse manipulator, on the primary circuit of a transformer. The secondary circuits of these transformers are all connected in series with each other and with the line. The transmitter station is therefore constituted in the manner described. The receiver station contains a similar number of transformers, the primary coils of which are also connected in series with each other and with the line, while the secondary coils constitute as many distinct circuits. Each of these circuits contains a special relay in series and a condenser in parallel with the secondary circuit of the transformer. The relay is a mechanical resonance relay, that is to say, it contains a part which can vibrate, and the period of vibration of which coincides with the frequency of the current passing through it, so that the part vibrates and the relay acts only when a current of the same frequency is passing through it. This part can be, for instance, simply a wire stretched between the poles of a magnet or of an electro-magnet, through which passes an alternating current. It is sufficient to regulate the length and the tension of the wire in order to suitably vary its natural period of vibration, and to cause it to vibrate when a current of suitable frequency passes through it. While vibrating, this wire can close a local circuit and produce suitable signals. Each condenser, on the contrary, placed in shunt on the secondary windings of the transformer, has such capacity that there is produced an electro-magnetic resonance circuit tuned for the frequency for which the relay is tuned. In this way the mechanical resonance and the electro-magnetic resonance help each other in sorting out the currents on the arrival when several electro-motive forces are simultaneously acting on the lines. It follows therefrom that, when several series of signals are sent through the line by simultaneously operating several manipulators, each relay produces those corresponding to the frequency for which it is doubly tuned, and receives only the message which is sent by the corresponding manipulator.

Figure 2:
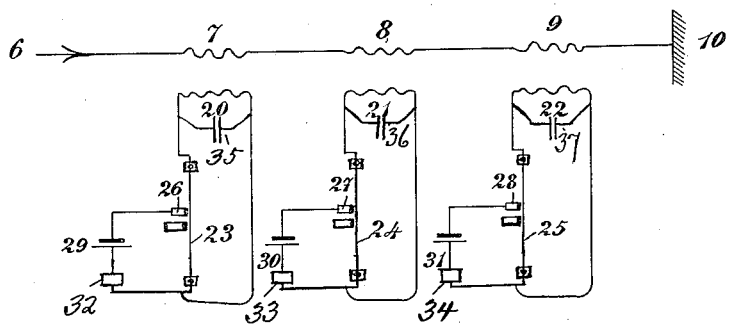

Figure 1 of the drawing represents a transmitting station and Fig. 2 a receiving station.

In Fig. 1, 1, 2, 3, represents three secondaries, in series, of three transformers; 4 is the communication with the ground; 5 is the communication with the line wire; 11, 12, and 13, represent three primaries of the said transformers; 14, 15 and 16, three sources of electro-motive power of different frequency (alternaters); 17, 18 and 19, represent three keys, for example, of the Morse type, which serve to close or open at a given moment the circuits of the electro-motive forces.

In Fig. 2, 6 represents a communication with the line wire; 10 that with the ground; 7, 8 and 9 are three primaries, disposed in series, of three transformers; 20, 21 and 22 are the secondaries of the said transformers; 35, 36, 37 are the condensers. The circuit of the transformer 20 and of its condenser 35 vibrates with a frequency generated by the alternater 14; the circuit of transformer 21 and its condenser 36 vibrates with a frequency generated by alternater 15; and the circuit of transformer 22 and its condenser 37 vibrates with a frequency generated by alternater 16. 23, 24, 25 represent three vibrating wires mechanically tuned with the corresponding frequencies. In place of these wires, as has been before stated, may be substituted other similar apparatus which will respond mechanically to an alternating current of given frequency. 26, 27, 28 represent three metallic pieces with which the vibrating wires produce contact when they vibrate. 29, 30, 31 are three local elements. 32, 33, 34 represent three Morse apparatus. When for example, the key 17 is closed, it sets up the electro-motive force of the alternater 14 which has a given frequency. A current of this frequency circulates along the wire, it sets up an intense current in the circuit of the condenser in secondary winding 20, whence it follows that a current circulates through the wire 23 which vibrates and by vibrating is brought in contact with the piece 26 and closes the circuit of the element 29. The current sent by this latter through the Morse apparatus 32 produces a signal. The other two wires 24 and 25 do not move. If more keys than one are manipulated simultaneously, then a complex current passes through the line, that is a current due to the amount of the electro-motive forces which are set in action, but each receiver answers to the frequency with which it is in accord. That is, the complex current circulating in the line is analyzed by the receiving circuits, but since this analysis is not complete, each vibrating wire receives a complex current in which the principal frequency predominates. It vibrates under the effect of this principal current and remains indifferent to the others. By this means of combining two vibrations, the mechanical and the electro-magnetic, it is possible to separate a large number of signals thus obtaining an important technical result which attempts hitherto have not succeeded in reaching.

I claim:—

In a system of multiple and simultaneous telegraphy, the combination with a main line, of a plurality of transformers at a receiving station, the primaries of which transformers are connected in series to each other and to the main line, a plurality of condensers each in circuit with a secondary of a transformer, the circuit of each condenser being tuned to a corresponding frequency in a transmitting station, vibrating wires each in circuit with a secondary and a condenser and mechanically tuned with the corresponding frequency, metallic pieces with which said vibrating wires are adapted to make contact when vibrated, a plurality of Morse apparatus each in circuit with a vibrating wire and a metallic piece as described and a battery element in the circuit of each of the Morse apparatus.

In testimony whereof I have signed my name to this specification in the presence of two subscribing witnesses.

FERDINANDO LORI.

Witnesses:
G. B. ZAMARDO,
G. BIZZARRI.